United States Patent
Mihara et al.

(10) Patent No.: US 9,828,018 B2
(45) Date of Patent: Nov. 28, 2017

(54) OUTER COLUMN FOR TELESCOPIC STEERING DEVICE AND TELESCOPIC STEERING DEVICE

(71) Applicant: NSK LTD., Tokyo (JP)

(72) Inventors: Shin Mihara, Maebashi (JP); Masajirou Watanabe, Maebashi (JP); Ryota Murata, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/102,595

(22) PCT Filed: Nov. 21, 2014

(86) PCT No.: PCT/JP2014/080981
§ 371 (c)(1),
(2) Date: Jun. 8, 2016

(87) PCT Pub. No.: WO2015/133017
PCT Pub. Date: Sep. 11, 2015

(65) Prior Publication Data
US 2016/0318541 A1    Nov. 3, 2016

(30) Foreign Application Priority Data

Mar. 3, 2014  (JP) .................................. 2014-040344
Jul. 11, 2014  (JP) .................................. 2014-143054

(51) Int. Cl.
*B62D 1/185*    (2006.01)
*B62D 1/184*    (2006.01)

(52) U.S. Cl.
CPC ............. *B62D 1/185* (2013.01); *B62D 1/184* (2013.01)

(58) Field of Classification Search
CPC .................................................... B62D 1/185
See application file for complete search history.

(56) References Cited

U.S. PATENT DOCUMENTS 8,869,646 B2 * 10/2014 Tanaka ................ B60R 25/0211
                                                  280/775
2008/0141817 A1  6/2008 Fuchigami et al.
(Continued)

FOREIGN PATENT DOCUMENTS

EP     1790550 A1    5/2007
JP     2008168892 A  7/2008
(Continued)

OTHER PUBLICATIONS

Search Report ( PCT/ISA/210 ) dated Feb. 24, 2015, issued by the International Searching Authority in counterpart International Application No. PCT/JP2014/080981.
(Continued)

*Primary Examiner* — Nicole T Verley
(74) *Attorney, Agent, or Firm* — Sughrue Mion, PLLC (57) ABSTRACT

An upper surface of a front portion of an outer column is provided with a slit having a substantial T shape as seen from a radial direction and a pair of sandwiched portions. In a rear end side portion of an outer surface of the sandwiched portion, a dented portion is formed to be dented inward in a width direction at a lower half portion thereof. Accordingly, a distance from the position of a force which acts on the sandwiched portions according to an operation on an adjustment lever to a position of a main outer column body which is a fulcrum of elastic deformation becomes longer. Therefore, a structure capable of reducing change of a force necessary for operating the adjustment lever and stably fitting and holding an inner column regardless of the position of a steering wheel in a front-rear direction is implemented.

5 Claims, 9 Drawing Sheets

(56) References Cited

U.S. PATENT DOCUMENTS

| | | | |
|---|---|---|---|
| 2010/0000366 A1 | 1/2010 | Nomura et al. | |
| 2010/0242663 A1* | 9/2010 | Takezawa | B62D 1/184 74/493 |
| 2010/0242665 A1* | 9/2010 | Nagamura | B62D 1/185 74/493 |
| 2011/0204610 A1* | 8/2011 | Kwon | B62D 1/184 280/775 |
| 2013/0160595 A1* | 6/2013 | Moriyama | B62D 1/184 74/493 |
| 2013/0186153 A1* | 7/2013 | Tanaka | B60R 25/0211 70/187 |
| 2014/0318302 A1* | 10/2014 | Watanabe | B62D 1/184 74/493 |
| 2015/0107398 A1* | 4/2015 | Nagasawa | B22D 17/00 74/493 |
| 2015/0107399 A1* | 4/2015 | Nagasawa | B22D 19/045 74/493 |
| 2015/0122075 A1* | 5/2015 | Mihara | B62D 1/185 74/493 |
| 2015/0251682 A1* | 9/2015 | Kii | B62D 1/189 74/493 |
| 2016/0046317 A1* | 2/2016 | Nagasawa | B62D 1/184 74/493 |
| 2016/0214636 A1* | 7/2016 | Watanabe | B62D 1/185 |
| 2016/0318541 A1* | 11/2016 | Mihara | B62D 1/185 |

FOREIGN PATENT DOCUMENTS

| | | |
|---|---|---|
| JP | 2008174105 A | 7/2008 |
| JP | 2008302751 A | 12/2008 |
| JP | 20116056 A | 1/2011 |
| JP | 2012162151 A | 8/2012 |
| JP | 2013-23040 A | 2/2013 |
| JP | 2013-32074 A | 2/2013 |
| JP | 201332054 A | 2/2013 |
| WO | 2014163112 A1 | 10/2014 |

OTHER PUBLICATIONS

Written Opinion ( PCT/ISA/237 ) dated Feb. 24, 2015, issued by the International Searching Authority in counterpart International Application No. PCT/JP2014/080981.

Extended European Research Report dated Feb. 24, 2017, issued by the European Patent Office in counterpart European Application No. 14885019.1.

Search Report dated Feb. 24, 2017 issued by the European Patent Office in counterpart European Patent Application No. 14885019.1.

* cited by examiner

FIG.10

OUTER COLUMN FOR TELESCOPIC STEERING DEVICE AND TELESCOPIC STEERING DEVICE

TECHNICAL FIELD

The present invention relates to an improvement on a telescopic steering device which can adjust a position of a steering wheel in a front-rear direction and on an outer column to configure the telescopic steering device.

BACKGROUND ART

Figure 9:
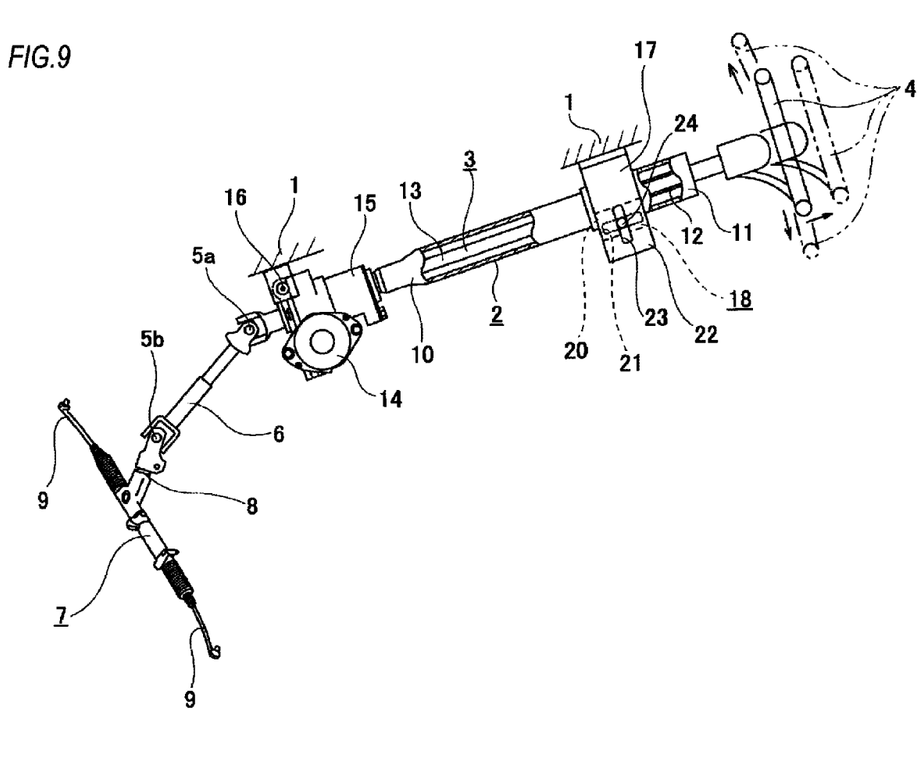
FIG. 9 is a partial sectional side view illustrating an example of a known vehicle steering device.

As a steering device for providing a steering angle to steering wheels (generally, front wheels, except for special vehicles such as forklifts), for example, a structure as shown in FIG. 9 is widely known. In this steering device, a steering shaft 3 is rotatably supported on an inner side of a cylindrical steering column 2 which is supported on a vehicle body 1. A steering wheel 4 is fixed to a rear end portion of the steering shaft 3 protruding toward the rear side from a rear end opening of the steering column 2. If the steering wheel 4 is rotated, this rotation is transmitted to an input shaft 8 of a steering gear unit 7 through the steering shaft 3, a universal joint 5a, an intermediate shaft 6 and a universal joint 5b. If the input device 8 rotates, a pair of tie rods 9, 9 provided on both sides of the steering gear unit 7 are pushed and pulled, whereby a steering angle according to the operation amount of the steering wheel 4 is provided to a pair of left and right steering wheels. In this specification and claims, a front-rear direction, a width direction, and a vertical direction refers to a front-rear direction, a width direction, and a vertical direction of a vehicle body on which a telescopic steering device is mounted. That is, in FIG. 9, with respect to the steering column 2, the steering gear unit 7 is positioned on the front side, and the steering wheel 4 is positioned on the rear side.

In this steering device, there has been known a telescopic mechanism for adjusting the position of the steering wheel in the front-rear direction according to the physique or driving position of a driver. In order to configure this telescopic mechanism, a rear portion of an inner column 10 provided on a front side is fitted into a front portion of an outer column 11 provided on a rear side so as to be relatively displaceable in an axial direction, whereby the steering column 2 is configured such that its total length can increase or decrease in a telescopic manner. Also, an outer tube 12 and an inner shaft 13 are assembled by spline engagement or the like, whereby the steering shaft 3 is configured to be able to transmit torque and able to be extended and contracted.

The example shown in FIG. 9 incorporates a tilt mechanism capable of adjusting a vertical position of the steering wheel 4. Further, this example incorporates an electric power steering device which uses an electric motor 14 as an auxiliary power source to reduce a force necessary for operating the steering wheel 4. To this end, on the front end portion of the steering column 2 (the inner column 10), a housing 15 including a worm reducer and the like configuring the electric power steering device is provided, and the housing 15 is supported on the vehicle body 1 to be able to swing around a horizontal shaft 16. On a supporting bracket 17 supported at a different location of the vehicle body 1, a column-side bracket 18 fixed to a portion of the steering column 2 (the outer column 11) is supported to be displaceable in the front-rear direction and the vertical direction.

In the tilt mechanism and the telescopic mechanism except for an electric type, they are required to be switchable between a state where they can adjust the position of the steering column 2 and a state where they can hold the steering column at an adjusted position. An example of a conventional structure of a position adjusting mechanism will be described with reference to FIG. 10 in addition to FIG. 9. In order to make it possible to elastically expand or contract an inner diameter of the front end portion of the outer column 11, a slit 19 is formed on a lower surface of the outer column 11 from the front end portion to a center side portion to be long in the axial direction. A pair of sandwiched portions 20, 20 configuring the column-side bracket 18 are provided on the outer column 11 at positions interposing the slit 19 therebetween in the width direction. At positions of the sandwiched portions 20, 20 which match with each other, front-rear long holes 21, 21 are formed long in the axial direction of the outer column 11. In a pair of supporting plate members 22, 22 which configure the supporting bracket 17 and sandwiches the sandwiched portions 20, 20 from both sides in the width direction and are parallel to each other, vertical long holes 23, 23 are formed to have a partial arc shape about the horizontal shaft 16. Here, the vertical direction of FIG. 10 corresponds to the vertical direction of the vehicle body. An adjustment rod 24 is inserted through the long holes 21, 23.

An expansion/contraction mechanism incorporated in the adjustment rod 24 makes it possible to expand or contract an interval between the supporting plate members 22, 22, thereby making it possible to adjust the position of the outer column 11 in the vertical direction and the front-rear direction and to hold the outer column 11 at the adjusted position. In order to configure the expansion/contraction mechanism, on a portion of a base end portion of the adjustment rod 24 protruding from an outer surface of one supporting plate member 22 (the left one of FIG. 10) of the supporting plate members 22, 22, a base end portion of an adjustment lever 25 is fixed, and a cam device 26 is provided between the outer surface of the one supporting plate member 22 and the adjustment lever 25. The cam device 26 is expanded or contracted in the axial direction based on a relative displacement between a drive-side cam 27 and a driven-side cam 28, and the driven-side cam 28 is engaged with the vertical long hole 23 formed in the one supporting plate member 22 to be displaceable only along the vertical long hole 23 (with rotation thereof being restricted). The drive-side cam 27 is configured to be rotatable together with the adjustment rod 24 by the adjustment lever 25. On a portion of a tip end portion of the adjustment rod 24 protruding from the outer surface of the other supporting plate member 22 (the right one of FIG. 10) of the supporting plate members 22, 22, a nut 29 is fixed, and a thrust bearing 30 and a pressing plate 31 are provided between the other supporting plate member 22 and the nut 29. On an inner surface of the pressing plate 31, an engaging piece 32 is provided, and the engaging piece 32 is engaged with the vertical long hole 23 formed in the other supporting plate member 22 to be displaceable only along that vertically long hole 23.

Figure 10:
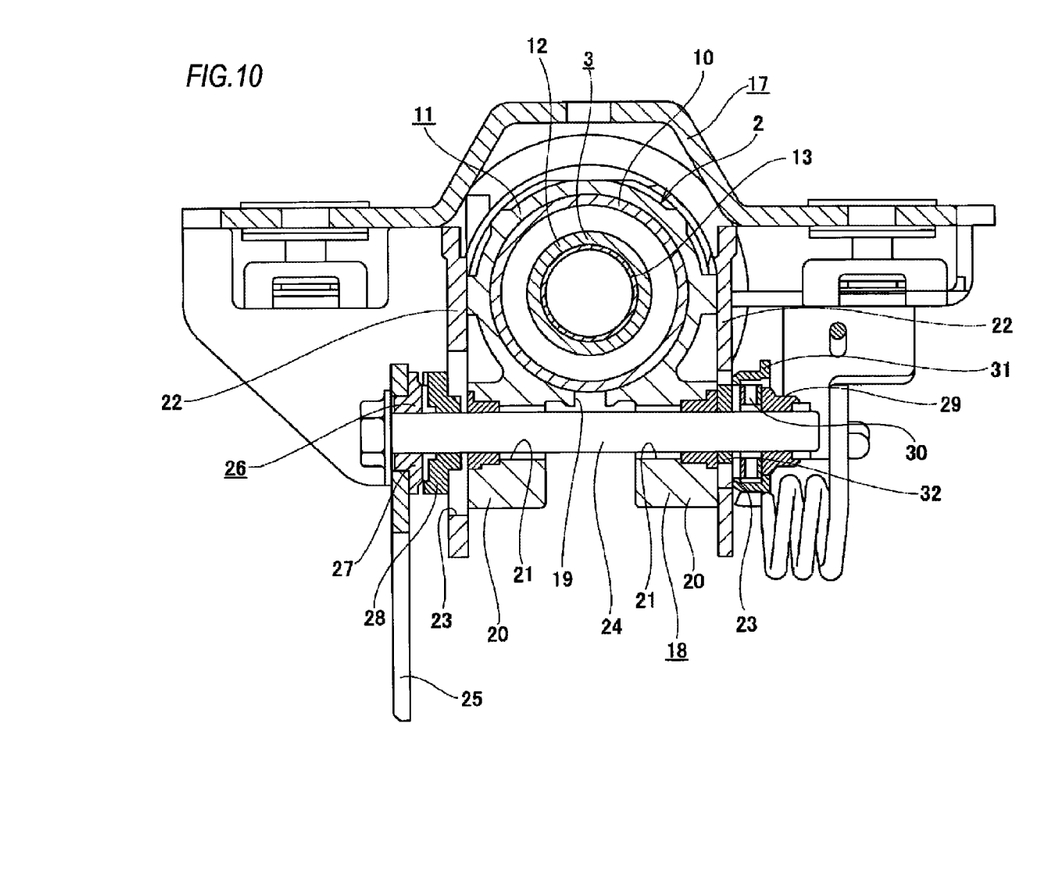
FIG. 10 is a cross-sectional view illustrating an example of a conventional structure of a position adjusting mechanism of a steering wheel.

In order to adjust the position of the steering wheel 4, the adjustment lever 25 is rotated toward a predetermined direction (downward), whereby the drive-side cam 27 is rotated such that the dimension of the cam device 26 in the axial direction decreases. As a result, the interval between the inner surfaces of the driven-side cam 28 and the nut 29 facing each other is expanded, whereby the force of the supporting plate members 22, 22 pressing the sandwiched portions 20, 20 is released. At the same time, the inner diameter of the fitting portion which is the front portion of the outer column 11 and internally fitted with the rear portion of the inner column 10 is elastically expanded, whereby surface pressure acting on the contact area between the inner circumferential surface of the front portion of the outer column 11 and the outer circumferential surface of the rear portion of the inner column 10 is reduced. In this state, the position of the steering wheel 4 in the vertical direction and the front-rear direction can be adjusted within a range in which the adjustment rod 24 can be displaced inside the long holes 21, 23.

After the steering wheel 4 is moved to a desired position, the adjustment lever 25 is rotated toward a direction (upward) opposite to the predetermined direction, whereby the dimension of the cam device 26 in the axial direction is increased. As a result, the interval between the inner surfaces facing each other in the driven-side cam 28 and the nut 29 (which correspond to a pair of pressing members) is contracted, whereby the sandwiched portions 20, 20 are strongly pressed by the supporting plate members 22, 22. At the same time, the inner diameter of the portion of the front portion of the outer column 11 internally fitted with the rear portion of the inner column 10 is elastically contracted, whereby the surface pressure acting on the contact area between the inner circumferential surface of the front portion of the outer column 11 and the outer circumferential surface of the rear portion of the inner column 10 is increased. In this state, the position of the steering wheel 4 in the vertical direction and the front-rear direction is held at the adjusted position.

Incidentally, in order to ensure the flexibility of the portion of the front portion of the outer column 11 fitting on and holding the inner column 10, the front end portion of the slit 19 is opened to a front edge of the outer column 11. In this case, the rigidity of the front edge of the outer column 11 which is the open end side of the slit 19 becomes lowest, and the rigidity of the outer column 11 increases as proceeding toward the bottom end side of the slit 19. Therefore, in accordance with the position of the steering wheel 4 in the front-rear direction, a force necessary for operating the adjustment lever 25 to contract the inner diameter of the front portion of the outer column 11 changes.

In this regard, Patent Document 1 discloses a structure in which a slit includes a main slit portion which is formed in an axial direction and a sub slit portion which is formed in a circumferential direction in at least the front end portion of both end portions of the main slit portion such that an end portion of the main slit portion in the axial direction is open to a center portion of the sub slit portion in the circumferential direction, and the shape of the slit as seen from the radial direction is a T shape or an H shape. With this structure, while it is possible to ensure the flexibility of the fitting and holding portion of the outer column, thereby reducing a force necessary for expanding or contracting the inner diameter of the fitting and holding portion, it is possible to alleviate concentration of stress on the end portions of the slit. However, even in this structure, there is room for improvement in order to stabilize a force necessary for operating the adjustment lever regardless of the position of the steering wheel in the front-rear direction.

BACKGROUND ART DOCUMENT

Patent Document

Patent Document 1: JP-A-2008-174105

SUMMARY OF THE INVENTION

Problems to be Solved

The present invention has been made in view of the above described circumstances, and an object of the present invention is to implement a structure capable of stabilizing a three necessary for operating an adjustment lever regardless of the position of a steering wheel in a front-rear direction.

Means for Solving the Problems

The present invention provides an outer column for a telescopic steering device, the outer column including:

a main column body which is formed in a substantially cylindrical overall shape and has a slit formed long in an axial direction at a front portion thereof; and a pair of sandwiched portions which are fixedly provided on the main column body to protrude upward or downward at positions interposing the slit therebetween in a width direction, wherein a pair of front-rear long holes are formed long in a front-rear direction on the sandwiched portions at positions matching with each other, and wherein in a rear end side portion of an outer surface of at least one sandwiched portion of the sandwiched portions, a dented portion is formed to be dented inward in the width direction at a position on a main column body side in a vertical direction.

Especially, in the outer column for the telescopic steering device according to the present invention, in the rear end side portion of the outer surface of at least one sandwiched portion of the sandwiched portions, the dented portion (non-contact portion is formed to be dented inward in the width direction at the position on the main column body side in the vertical direction (a lower half portion in a case of providing the sandwiched portions to protrude upward, and an upper half portion in a case of providing the sandwiched portions to protrude downward).

In the above outer column for the telescopic steering device according to the present invention, it is preferred that the dented portion be continuous to the front-rear long hole.

Further, it is preferred that a stepped portion formed between the dented portion and the sandwiched portion be formed to an opposite side to the main column body side with respect to a center position of the front-rear long hole in the vertical direction.

Further, it is preferred that a vertical dimension of the dented portion increase as proceeding toward a rear side.

Further, it is preferred that a vertical dimension of the sandwiched portions is larger at a rear end side portion of the main column body than at a front end side portion of the main column body.

The present invention further provides a telescopic steering device including a steering column, a supporting bracket, a rod member and an adjustment mechanism.

The steering column includes an inner column and an outer column externally fitted on a rear portion of the inner column and having a slit formed on a front portion thereof. Which is a fitting portion with the inner column such that an inner diameter of the front portion can be expanded or contracted based on the slit. A steering shaft is rotatably supported on the inner diameter side of this steering column. The steering shaft is configured by assembling an outer shaft and an inner shaft such that a total length of the steering shaft can be increased or decreased and which has a rear end portion where a steering wheel is supported and fixed.

The supporting bracket includes a pair of supporting plate members which sandwich a pair of sandwiched portions of the outer column from both sides in a width direction, and a mounting plate member which supports the supporting plate members to a vehicle body. The supporting plate members are formed with bracket-side through holes at a position which matches with front-rear long holes formed long in a front-rear direction on the sandwiched portions.

The rod member is inserted through the front-rear long holes and the bracket-side through holes.

The adjustment mechanism is configured to expand or contract an interval between a pair of pressing members provided at both end portions of the rod member based on an operation on an adjustment lever provided at an end portion of the rod member. When the interval is contracted, an interval between inner surfaces of the supporting plate members is contracted, whereby the inner surfaces of the supporting plate members and outer surfaces of the sandwiched portions are frictionally engaged such that a position of the outer column in the front-rear direction with respect to the inner column is fixed.

Especially, in the telescopic steering device according to the present invention, the outer column is the outer column according to the present invention as described above.

Advantages of the Invention

According to the outer column for the telescopic steering device and the telescopic steering device configured according to the present invention as described above, it is possible to stabilize a force necessary for operating the adjustment lever regardless of the position of the steering wheel in the front-rear direction. That is, in the rear end side portion of the outer surface of at least one sandwiched portion of the pair of sandwiched portions, the dented portion is formed to be dented inward in the width direction at a position on the main column body side in the vertical direction. Therefore, in a case where the position of the steering wheel in the front-rear direction is located on the front side from the center position of an adjustable range, forces of the pair of supporting plate members pressing the sandwiched portions from both sides in the width direction can be effectively used as a force for contracting the inner diameter of the fitting/holding portion of the inner column, which is the front portion of the outer column (the main column body). Therefore, a force necessary for operating the adjustment lever can be suppressed from increasing.

DETAILED DESCRIPTION OF EMBODIMENTS

First Embodiment

FIGS. 1 to 5 show a first embodiment of the present invention. The present invention as well as the present embodiment is characterized by a structure capable of stabilizing a force necessary for operating an adjustment lever 25 (see FIG. 10) (an operation force on the adjustment lever 25) (capable of reducing change of the operation force on the adjustment lever 25), regardless of a position of a steering wheel 4 (see FIG. 9) in a front-rear direction.

The structure and operation of the other part are similar to those in the above described existing structure, and thus repeated drawings and descriptions will be omitted or simplified. Hereinafter, characteristic parts of the present invention will be mainly described.

Figure 6:
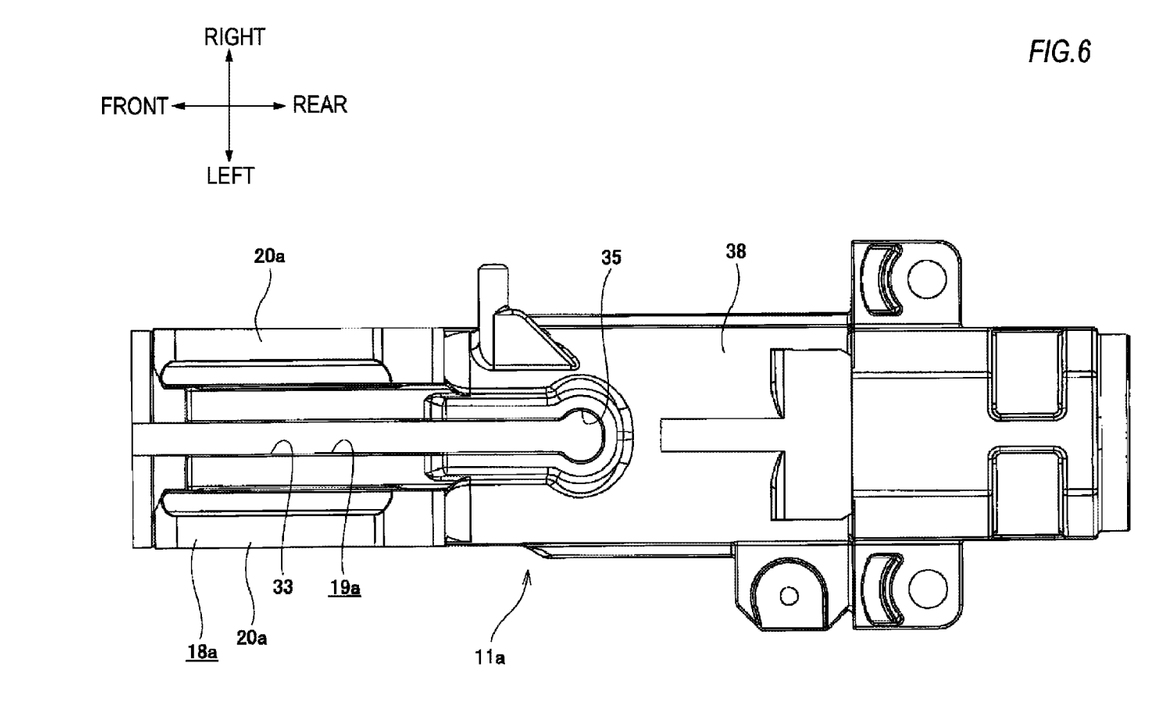
FIG. 6 is a view similar to FIG. 2 and illustrates another example of a shape of a slit.

In the present embodiment, an outer column includes a main outer column body 38 formed in a substantially cylindrical overall shape, and a pair of sandwiched portions 20a, 20a configuring a column-side bracket 18a. The main outer column body 38 is formed with a slit 19a in an upper surface of a front portion thereof (the left side of FIGS. 1 to 4) to have a substantial T shape as seen from a radial direction. The slit 19a is formed in order to reduce rigidity in the radial direction of the front portion of the main outer column body 38 for sufficiently increasing a contact pressure between an inner circumferential surface of the front portion of the main outer column body 38 and an outer circumferential surface of a rear portion of an inner column 10a according to an operation on the adjustment lever 25. The slit 19a includes a main slit portion 33 long in an axial direction, a sub slit portion 34 and a width-enlarged portion 35. The main slit portion 33 is formed between the sandwiched portions 20a, 20a to extend in the axial direction (parallel to a center axis) of the outer column 11a. The sub slit portion 34 is formed to extend in a circumferential direction in the front end portion of the main slit portion 33 such that a front end portion of the main slit portion 33 is connected to a center portion of the sub slit portion in the circumferential direction (such that the front end portion of the main slit portion 33 is opened to the center portion of the sub slit portion in the circumferential direction). The width-enlarged portion 35 is formed in a rear end portion of the main slit portion 33 in a substantially circular shape as seen from the radial direction such that the rear end portion of the main slit portion 33 is connected to a center portion of the width-enlarged portion in the circumferential direction (such that the rear end portion of the main slit portion 33 is opened to the center portion of the width-enlarged portion in the circumferential direction). However, as shown in FIG. 6, without forming the sub slit portion 34, a front end portion of a slit 19a may be opened to a front edge of the outer column 11a.

Figure 1:
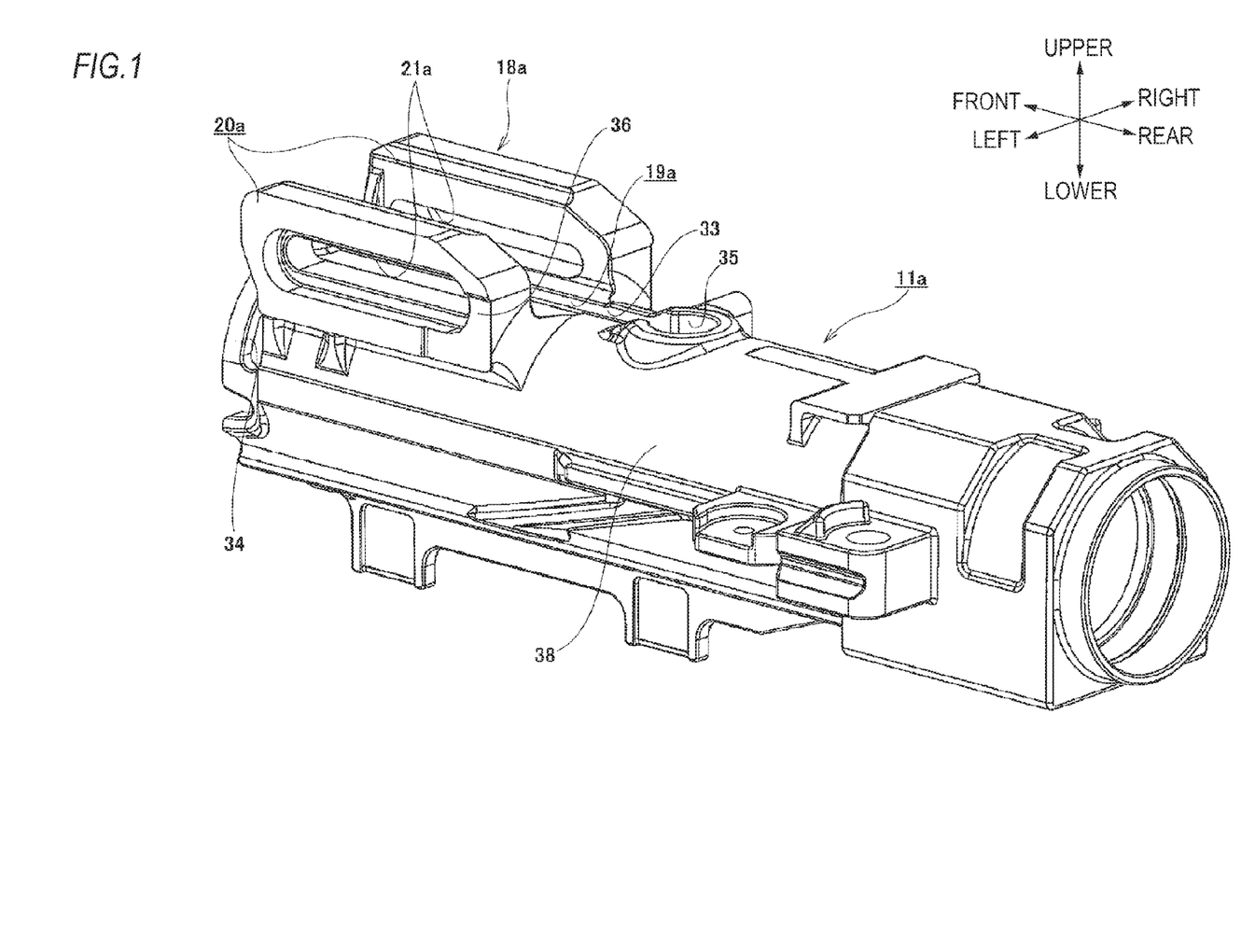
FIG. 1 is a perspective view illustrating an outer column according to a first embodiment of the present invention as seen from the upper rear side.
Figure 2:
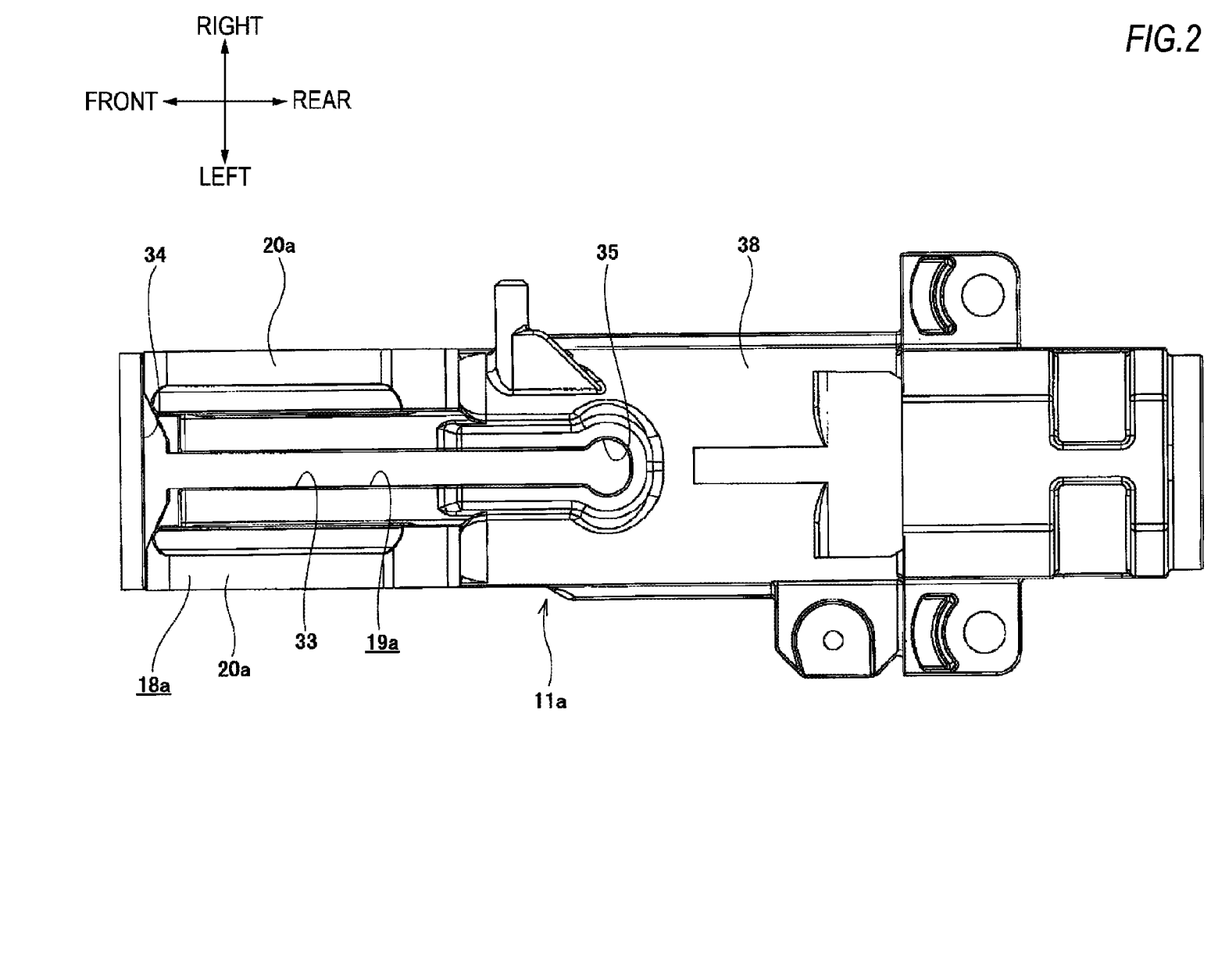
FIG. 2 is a plan view illustrating the outer column as seen from the above.

The sandwiched portions 20a, 20a are integrally formed with the main outer column body 38 on an outer circumferential surface of the main outer column body 38 at positions interposing the main slit portion 33 of the slit 19a therebetween in the width direction (the circumferential direction) and extend in parallel with each other. However, the sandwiched portions 20a, 20a may be formed by fixing separate members by welding or the like. In either case, the sandwiched portions 20a, 20a are formed with front-rear long holes 21a, 21a long in the axial direction of the outer column 11a at positions which match each other.

Figure 3:
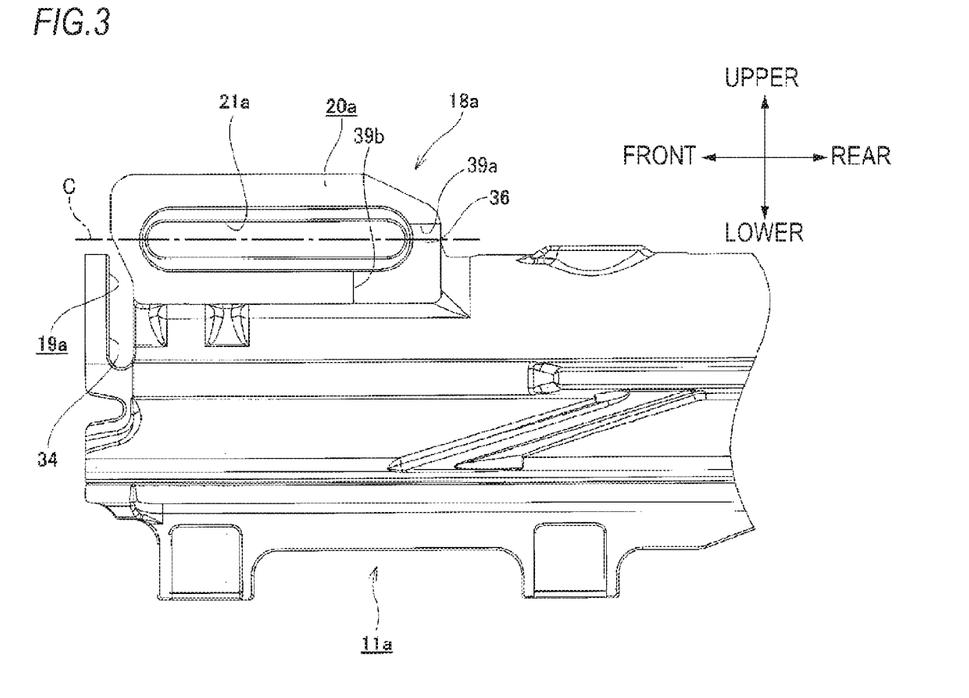
FIG. 3 is an enlarged side view of a main portion of the outer column.

Further, in the present embodiment, in rear end side portions of the outer surfaces of the sandwiched portions 20a, 20a (in a case where the steering wheel 4 is located at a center position of the adjustable range, portions on the rear side from portions where an adjustment rod 24 is located), dented portions 36, 36 are formed as non-contact portions to be dented inward in the width direction at lower half portions which are base half portions of the sandwiched portions 20a, 20a (half portions on the main outer column body 38 side in the vertical direction). That is, the width dimension of a rear end side portion of the column-side bracket 18a configured by the sandwiched portions 20a, 20a (the interval between the outer surfaces of the rear end side portions of the sandwiched portions 20a, 20a) is smaller at the lower half portions than at the upper half portions.

Between the sandwiched surfaces (outer surfaces) of the sandwiched portions 20a, 20a and the dented portions 36, 36, there is formed a stepped portions 39a in a rear side of the front-rear long hole 21a, and there is formed a stepped portion 39b in a column-center side of the front-rear long hole 21a. The stepped portions 39a, 39b are connected to the front-rear long holes 21a, 21a. That is, at least a portion of the front-rear long holes 21a, 21a is continuous to the dented portions 36, 36.

Further, the stepped portion 39a which is formed between the dented portions 36, 36 and the sandwiched surfaces of the sandwiched portions 20a, 20a are formed to an opposite side to the main outer column body side with respect to a vertically center position C of the front-rear long holes 21a, 21a.

The rear portion of the inner column 10a is internally fitted in the front portion of the outer column 11a as described above to be able to be displaced in the axial direction, accordingly, a telescopic steering column 2a is configured. Further, the middle portion of the steering column 2a is supported on a vehicle body 1 through a supporting bracket 17a (see FIG. 9). The supporting bracket 17a is formed by bending a metal plate, such as a steel plate, capable of ensuring necessary strength and rigidity in a substantially U shape, and includes a mounting plate member 37 for supporting on the vehicle body, and a pair of supporting plate members 22a, 22a hanged down from the lower surface of the mounting plate member 37 and parallel to each other in the width direction. In a state where the sandwiched portions 20a, 20a are sandwiched from both sides in the width direction by the pair of the supporting plate members 22a, 22a, the adjustment rod 24 is inserted through the vertical long holes 23, 23 in the supporting plate members 22a, 22a and front-rear long holes 21a, 21a. Further, an expansion/contraction mechanism (for example, the cam device 26 and the nut 29 shown in FIG. 10) incorporated in the adjustment rod 24 makes it possible to expand or contract the interval between the supporting plate members 22a, 22a, thereby adjusting the position of the outer column 11 in the vertical direction and the front-rear direction and holding the outer column 11 at the adjusted position.

According to the telescopic steering column device of the present embodiment as described above, regardless of the position of the steering wheel 4 in the front-rear direction, it is possible to reduce change of a force necessary for operating the adjustment lever 25 (see FIG. 9). The reason will be described below.

Figure 4A:
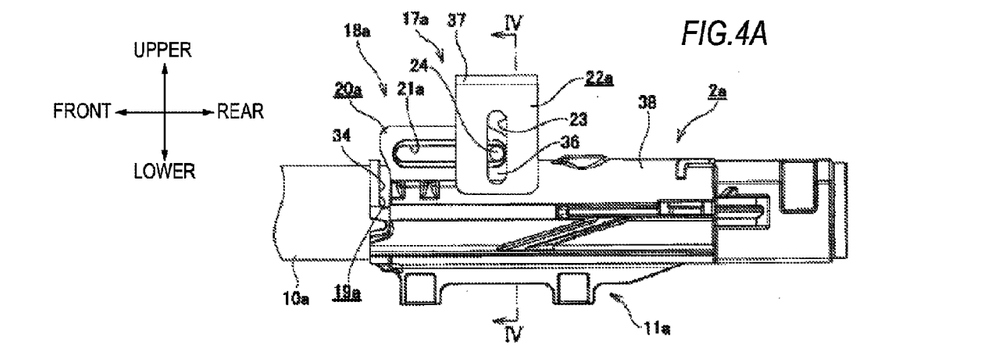
FIG. 4A is an enlarged side view of a main portion showing a positional relation between supporting plate members and sandwiched portions in a state where a steering wheel is located at a front end position of an adjustable range.

As shown in FIG. 4A, in a state where the steering wheel 4 is moved to the front end position of the adjustable range (a state where the adjustment rod 24 is engaged with the rear end portions of the front-rear long holes 21a, 21a), the pair of supporting plate members 22a, 22a configuring the supporting bracket 17a are located on both sides in the width direction of the rear end portion of the slit 19a having relatively high rigidity in the outer column 11a. In this state, if the adjustment lever 25 is operated to reduce the interval between the supporting plate members 22a, 22a in order to hold the position of the steering wheel 4 in the front-rear direction at the adjusted position (the front end position), the inner surfaces of the supporting plate members 22a, 22a come into contact with rear end side portions of the outer surfaces of the pair of the sandwiched portions 20a, 20a. In the present embodiment, since the dented portions 36, 36 are formed in the lower half portions of the rear end side portions of the outer surfaces of the sandwiched portions 20a, 20a to be dented inward in the width direction, only the upper half portions of the outer surfaces of the sandwiched portions 20a, 20a come into contact with the inner surfaces of the supporting plate members 22a, 22a. According to an operation on the adjustment lever 25, the supporting plate members 22a, 22a are elastically deformed so as to approach each other in the width direction as proceeding toward the lower end portions.

Figure 5A:
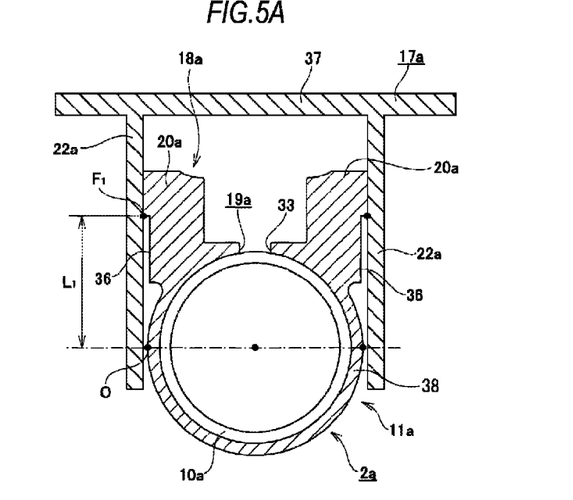
FIG. 5A is a cross-sectional view along a line IV-IV of FIG. 4A.
Figure 5B:
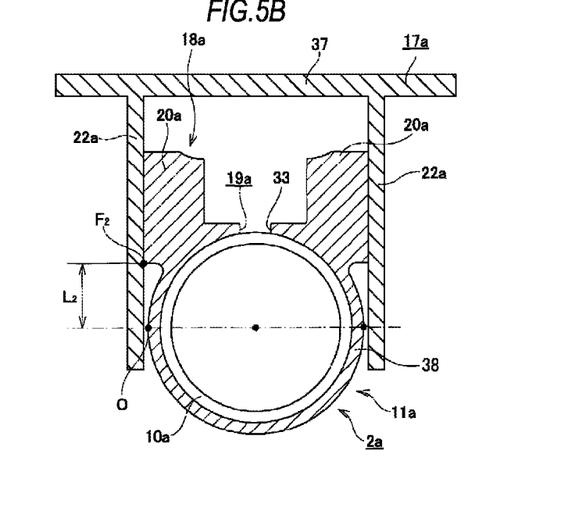
FIG. 5B is a cross-sectional view along a line IV'-IV' of FIG. 4C.

Therefore, in the present embodiment, in a case of elastically deforming the vicinity of the rear end portion of the slit 19a having relatively high rigidity in the main slit portion 33 in order to reduce its diameter, it is possible to lengthen a distance $L_1$ from a portion which is a fulcrum of the elastic deformation FIG. 5A, a portion O of the main outer column body 38 which is an intersection between the main outer column body 38 and a virtual line perpendicular to the center axis of the outer column 11a and extending in a horizontal direction) to a force point $F_1$ (see FIG. 5A) which is the lower end portion of the contact portion between the outer surface of the sandwiched portions 20a, 20a and the inner surfaces of the supporting plate members 22a, 22a. Therefore, it is possible to efficiently use the supporting plate members 22a, 22a pressing the sandwiched portions 20a, 20a as a force for contracting the inner diameter of the front portion of the main outer column body 38. As a result, even in a case of elastically deforming the vicinity of the rear end portion of the slit 19a having relatively high rigidity in the main outer column body 38, it is possible to suppress a force necessary for operating the adjustment lever 25 from needlessly increasing.

Figure 4B:
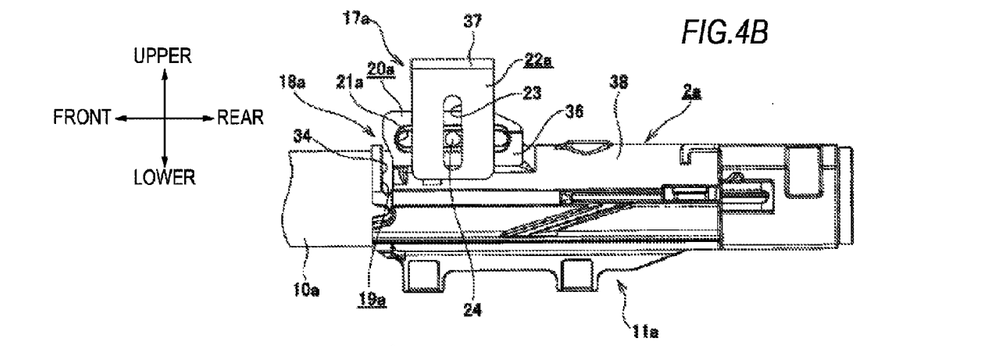
FIG. 4B is an enlarged side view of the main portion showing the positional relation in a state where the steering wheel is located at a middle position.
Figure 4C:
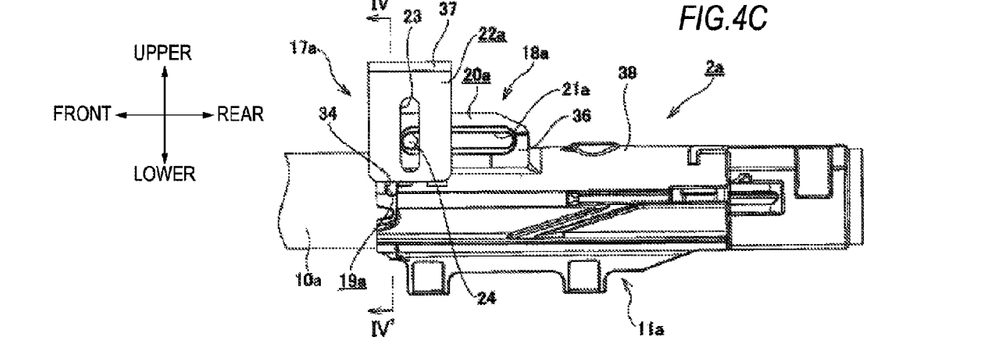
FIG. 4C is an enlarged side view of the main portion showing the positional relation in a state where the steering wheel is located at a rear end position.

On the other hand, as shown in FIG. 4C, in a state where the steering wheel 4 is moved to the rear end position of the adjustable range (a state where the adjustment rod 24 is engaged with the front end portions of the front-rear long holes 21a, 21a), a distance $L_2$ from a portion which is a fulcrum of the elastic deformation O (see FIG. 5B) to a force point $F_2$ (see FIG. 5B) which is the lower end portion of the contact portion between the outer surface of the sandwiched portions 20a, 20a and the inner surface of the supporting plate members 22a, 22a becomes shorter (becomes the same as that in the case of the existing structure). Also, as shown in FIG. 4B, in a state where the steering wheel 4 is moved to the center position of the adjustable range (a state where the adjustment rod 24 is engaged with the middle portion of the front-rear long holes 21a, 21a), a distance between a portion which is a fulcrum of elastic deformation and a force point which is the rear side portion of the lower end portion of the contact portion between the outer surface of the sandwiched portions 20a, 20a and the inner surface of both supporting plate members 22a, 22a becomes longer, and a distance between the portion which is a fulcrum of elastic deformation and the front side portion of the lower end portion of the contact portion becomes similarly shorter. That is, in a case of elastically deforming the vicinity of the front end portion to the middle portion of the slit 19a having relatively low rigidity in the main outer column body 38, a distance between a fulcrum of the elastic deformation and a force point is the same as that in the case of the existing structure. Therefore, regardless of the position of the steering wheel 4 in the front-rear direction, it is possible to stabilize a force necessary for operating the adjustment lever 25.

In the present embodiment, since the front-rear long holes 21a, 21a are continuous to the dented portions 36, 36, the supporting plate members 22a, 22a are easily bent toward the dented portions 36, 36 according to a claiming operation on the adjustment lever 25, and a force necessary for operating the adjustment lever 25 is easily decreased.

Especially, since the stepped portion 39a which is formed between the dented portions 36, 36 and the sandwiched surfaces of the sandwiched portions 20a, 20a are formed to the opposite side to the main outer column body side with respect to the vertically center position C of the front-rear long holes 21a, 21a, it is possible to further reduce a force necessary for operating the adjustment lever 25.

Second Embodiment

Figure 7:
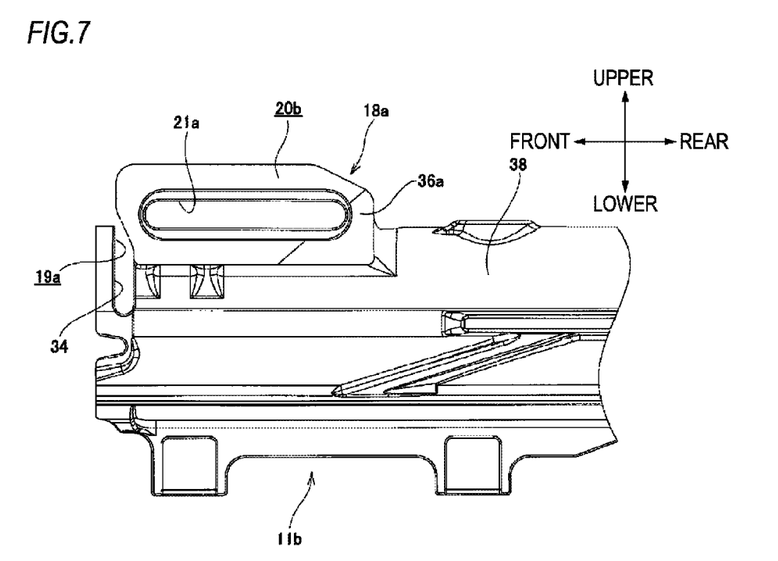
FIG. 7 is a view similar to FIG. 3 and illustrates a second embodiment of the present invention.

FIG. 7 shows a second embodiment of the present invention. In an outer column 11b according to the present invention, at a lower half portion of the rear end side portion of the outer surface of a pair of sandwiched portions 20b, 20b, a dented portions 36a is formed such that its dimension in the vertical direction increases as proceeding toward the rear side. That is, stepped portions 39 which are formed between the dented portions 36, 36 and the sandwiched surfaces of the sandwiched portions 20a, 20a are formed to be inclined such that the vertical dimension of the sandwiched portions 20b, 20b increases as proceeding from the front end side portion toward the rear end side portion.

In the case of the present embodiment as described above, since it is possible to increase the distance from the position of a force point F of a force acting from the inner surfaces of the pair of supporting plate members 22a, 22a (see FIGS. 4 to 5) to the fulcrum O as the steering wheel 4 is displaced toward the rear side, it is possible to make even a force necessary for operating the adjustment lever 25 (see FIG. 9).

The configuration and operation of the other parts are the same as those of the above-described first embodiment, and thus repeated drawings and descriptions are omitted.

Third Embodiment

Figure 8:
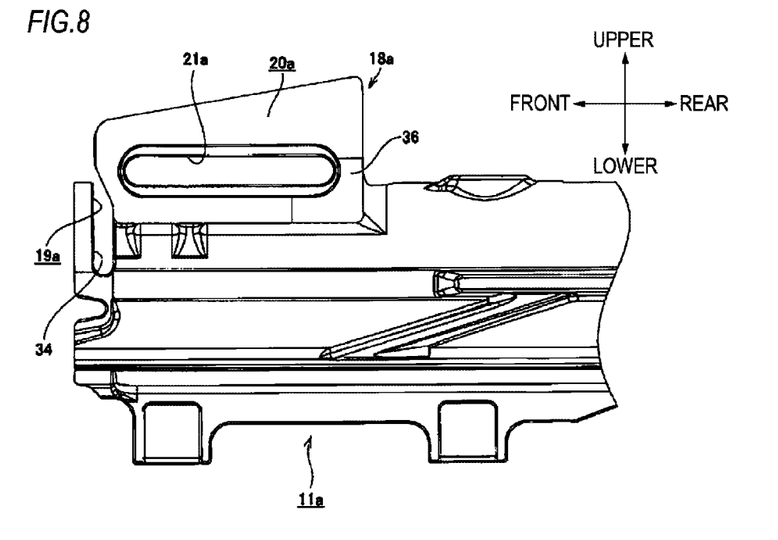
FIG. 8 is a view similar to FIG. 3 and illustrates a third embodiment of the present invention.

FIG. 8 shows a third embodiment of the present invention. As shown in FIG. 8, a pair of sandwiched portions 20a is thickened upward as proceeding toward the rear side of the vehicle body which is the right side of FIG. 8, and the vertical dimension of the sandwiched portion 20a is larger at a rear end side portion of the main outer column body 38 than at a front end side portion thereof.

The configuration and operation of the other parts are the same as those of the above described first embodiment, and thus repeated drawings and descriptions are omitted.

In the outer column 11a shown in FIG. 1, since the side where the slit 19a and the pair of sandwiched portions 20a, 20a are formed is the front side of the outer column 11a, the other side can be referred to as the rear side. This is also applicable to FIGS. 7 and 8.

INDUSTRIAL APPLICABILITY

In the present invention, it is essential to implement a telescopic steering device for adjusting a position of a steering wheel in the front-rear direction. However, it is optional to implement a tilt steering device for adjusting the position of a steering wheel together with the telescopic steering device.

Further, the relation between the upper side and lower side of the steering column in the vertical direction may be reverse to that of the above-described embodiments. That is, the slit and the pair of sandwiched portions may be provided on the lower side of the outer column.

However, in order to ensure a space around knees of a driver, it is preferable that sandwiched portions be provided on the upper side from a center axis in the axial direction (the center axis in the front-rear direction) of the main column body.

Also the dented portion may be formed only in the outer surface of either one sandwiched portion of the pair of sandwiched portions.

This application is based on Japanese Patent Application No. 2014-040344, filed Mar. 3, 2014, and Japanese Patent Application No. 2014-143054, filed Jul. 11, 2014, the entire contents of which are incorporated herein by reference.

DESCRIPTION OF REFERENCE NUMERALS

1: vehicle body
2, 2a: steering column
3: steering shaft
4: steering wheel
5a, 5b: universal joint
6: intermediate shaft
7: steering gear unit
8: input shaft
9: tie rod
10, 10a: inner column
11, 11a, 11b: outer column
12: outer tube
13: inner shaft
14: electric motor
15: housing
16: horizontal shaft
17, 17a: supporting bracket
18, 18a: column-side bracket
19, 19a: slit
20, 20a, 20b: sandwiched portion
21: front-rear long hole
22, 22a: supporting plate member
23: vertical long hole
24: adjustment rod
25: adjustment lever
26: cam device
27: drive-side cam
28: driven-side cam
29: nut
30: thrust bearing 31: pressing plate
32: engaging piece
33: main slit portion
34: sub slit portion
35: width-enlarged portion
36, 36a: dented portion
37: mounting plate member
38: main outer column body

The invention claimed is:

1. An outer column for a telescopic steering device, the outer column comprising:
   a main column body which is formed in a substantially cylindrical overall shape and has a slit formed longitudinally in an axial direction at a front portion thereof; and
   a pair of sandwiched portions which are fixedly provided on the main column body to protrude upward or downward at positions interposing the slit therebetween in a width direction,
   wherein a pair of front-rear long holes are formed longitudinally in a front-rear direction on the sandwiched portions at positions matching with each other,
   wherein in a rear end side portion of an outer surface of at least one sandwiched portion of the sandwiched portions, a dented portion is formed to be dented inward in the width direction at a position on a main column body side in a vertical direction, and
   wherein a vertical dimension of the dented portion increases as proceeding toward a rear side.

2. The outer column for the telescopic steering device according to claim 1,
   wherein the dented portion is continuous to the front-rear long hole.

3. The outer column for the telescopic steering device according to claim 1,
   wherein a stepped portion formed between the dented portion and the sandwiched portion is formed to an opposite side to the main column body side with respect to a center position of the front-rear long hole in the vertical direction.

4. The outer column for the telescopic steering device according to claim 1,
   wherein a vertical dimension of the sandwiched portions is larger at a rear end side portion of the main column body than at a front end side portion of the main column body.

5. A telescopic steering device comprising:
   a steering column which includes an inner column and an outer column, the outer column being externally fitted on a rear portion of the inner column and having a slit formed on a front portion thereof which is a fitting portion with the inner column such that an inner diameter of the front portion can be expanded or contracted based on the slit;
   a supporting bracket which includes a pair of supporting plate members which sandwich a pair of sandwiched portions of the outer column from both sides in a width direction, and a mounting plate member which supports the supporting plate members to a vehicle body, wherein the supporting plate members are formed with bracket-side through holes at a position which matches with front-rear long holes formed longitudinally in a front-rear direction on the sandwiched portions;
   a rod member which is inserted through the front-rear long holes and the bracket-side through holes; and
   an adjustment mechanism which is configured to expand or contract an interval between a pair of pressing members provided at both end portions of the rod member based on an operation on an adjustment lever provided at an end portion of the rod member, wherein when the interval is contracted, an interval between inner surfaces of the supporting plate members is contracted, whereby the inner surfaces of the supporting plate members and outer surfaces of the sandwiched portions are frictionally engaged such that a position of the outer column in the front-rear direction with respect to the inner column is fixed,
   wherein the outer column is the outer column according to claim 1.

* * * * *